United States Patent
Silaev et al.

(10) Patent No.: US 8,010,950 B1
(45) Date of Patent: Aug. 30, 2011

(54) METHOD AND APPARATUS FOR TESTING A BINDING APPLICATION PROGRAMMING INTERFACE

(75) Inventors: Dmitri Silaev, St. Petersburg (RU);
Daniel S. Rice, San Francisco, CA (US);
Stanislav V. Avzan, San Francisco, CA (US); Vasily Kopyl, St. Petersburg (RU)

(73) Assignee: Oracle America, Inc., Redwood Shores, CA (US)

( * ) Notice: Subject to any disclaimer, the term of this patent is extended or adjusted under 35 U.S.C. 154(b) by 1084 days.

(21) Appl. No.: 11/775,467

(22) Filed: Jul. 10, 2007

(51) Int. Cl.
*G06F 9/44* (2006.01)
(52) U.S. Cl. .......................... 717/131; 717/135; 717/162
(58) Field of Classification Search .................. 717/107, 717/124–135, 162–166
See application file for complete search history.

(56) References Cited

U.S. PATENT DOCUMENTS

2007/0124726 A1* 5/2007 Qureshi et al. ................ 717/124

OTHER PUBLICATIONS

Sun, "Java™ Technology Test Suite—Development Guide 1.2", Nov. 2003, Sun Microsystems, Inc., pp. i-xiv, 1-134.*

* cited by examiner

*Primary Examiner* — Ted T Vo
(74) *Attorney, Agent, or Firm* — Park, Vaughan, Fleming & Dowler LLP

(57) ABSTRACT

One embodiment of the present invention provides a system for testing a binding Application Programming Interface (API) on a device, wherein the binding API is bound to a native API for the device and provides different commands than the native API. During operation, the system executes a native-API test on the device through the native API to produce a native-API test-result. The system subsequently receives the native-API test-result from the device at a test-harness. Next, the system sends a binding-API test to a test-agent on the device which enables the test-agent to execute the binding-API test through the binding API to produce a binding-API test-result. The system then receives the binding-API test-result from the test-agent. Finally, the system compares the native-API test-result to the binding-API test-result to determine if the binding API is functionally equivalent to the native API.

19 Claims, 2 Drawing Sheets

METHOD AND APPARATUS FOR TESTING A BINDING APPLICATION PROGRAMMING INTERFACE

BACKGROUND

1. Field of the Invention

The present invention relates to software-testing. More specifically, the present invention relates to a method and apparatus for testing a binding Application Programming Interface (API).

2. Related Art

Computing systems usually provide programmers with a native Application Programming Interface (API), such as a set of system libraries, to facilitate creating software applications for the computing systems. However, using this native API to create complex software applications can be difficult because a native API typically provides only a basic set of commands to a programmer. Consequently, programmers will often create a "binding API", which is bound to the native API, but includes a greater selection of commands than the native API. However, for a given command flow, determining whether the binding API produces an equivalent result to the native API can be difficult because the binding API may not be mapped to the native API in a one-to-one relationship. Furthermore, many binding APIs are designed for use with a resource-constrained device, which exacerbates the problem of testing the binding API because of a lack of resources for executing test code on the resource-constrained device. Moreover, binding APIs are often created at a high level of abstraction, which enables the creation of hardware and operating system independent functionality, but which further adds to the difficulty of testing the binding API.

Hence, what is needed is a method and apparatus for testing a binding Application Programming Interface without the problems listed above.

SUMMARY

One embodiment of the present invention provides a system for testing a binding Application Programming Interface (API) on a device, wherein the binding API is bound to a native API for the device and provides different commands than the native API. During operation, the system executes a native-API test on the device through the native API to produce a native-API test-result. The system subsequently receives the native-API test-result from the device at a test-harness. Next, the system sends a binding-API test to a test-agent on the device which enables the test-agent to execute the binding-API test through the binding API to produce a binding-API test-result. The system then receives the binding-API test-result from the test-agent. Finally, the system compares the native-API test-result to the binding-API test-result to determine if the binding API is functionally equivalent to the native API.

In a variation on this embodiment, the device is a resource-constrained device.

In a variation on this embodiment, the test-result and the binding-API test-result can include: images; text; video; and audio.

In a variation on this embodiment, comparing the native-API test-result to the binding-API test-result involves comparing function calls made while executing the native-API test to function calls made while executing the binding-API test.

In a variation on this embodiment, the native-API test and the API test include equivalent command flows.

In a variation on this embodiment, the native API can be: a hardware API; a software API; and a combination of the hardware API and the software API.

In a variation on this embodiment, the test-agent facilitates executing the binding-API test by processing binding API commands, which are associated with the binding API.

DETAILED DESCRIPTION

The following description is presented to enable any person skilled in the art to make and use the invention, and is provided in the context of a parti-cular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media.

Overview

One embodiment of the present invention provides a test-harness that facilitates testing a binding Application Programming Interface (API) on a computing device. This test-harness executes two implementations of a command flow and then compares the results of executing the two implementations to determine if the two implementations are equivalent. Note that a first implementation of the command flow interacts with a native API associated with the device, and a second implementation interacts with a binding API that is bound to the native API. If the results are equivalent, then the binding API is functionally equivalent to the native API with respect to the command flow.

In one embodiment of the present invention, the device can be a resource-constrained device.

In one embodiment of the present invention, the device can include a test-agent that facilitates executing the second implementation of the command flow.

In one embodiment of the present invention, the test-harness can compare the results of the two implementations by performing: a binary equivalence check; a visual image comparison; an audio comparison; or any other method for comparing the results of the two implementations to determine if they are equivalent.

Computing Environment

Figure 1:
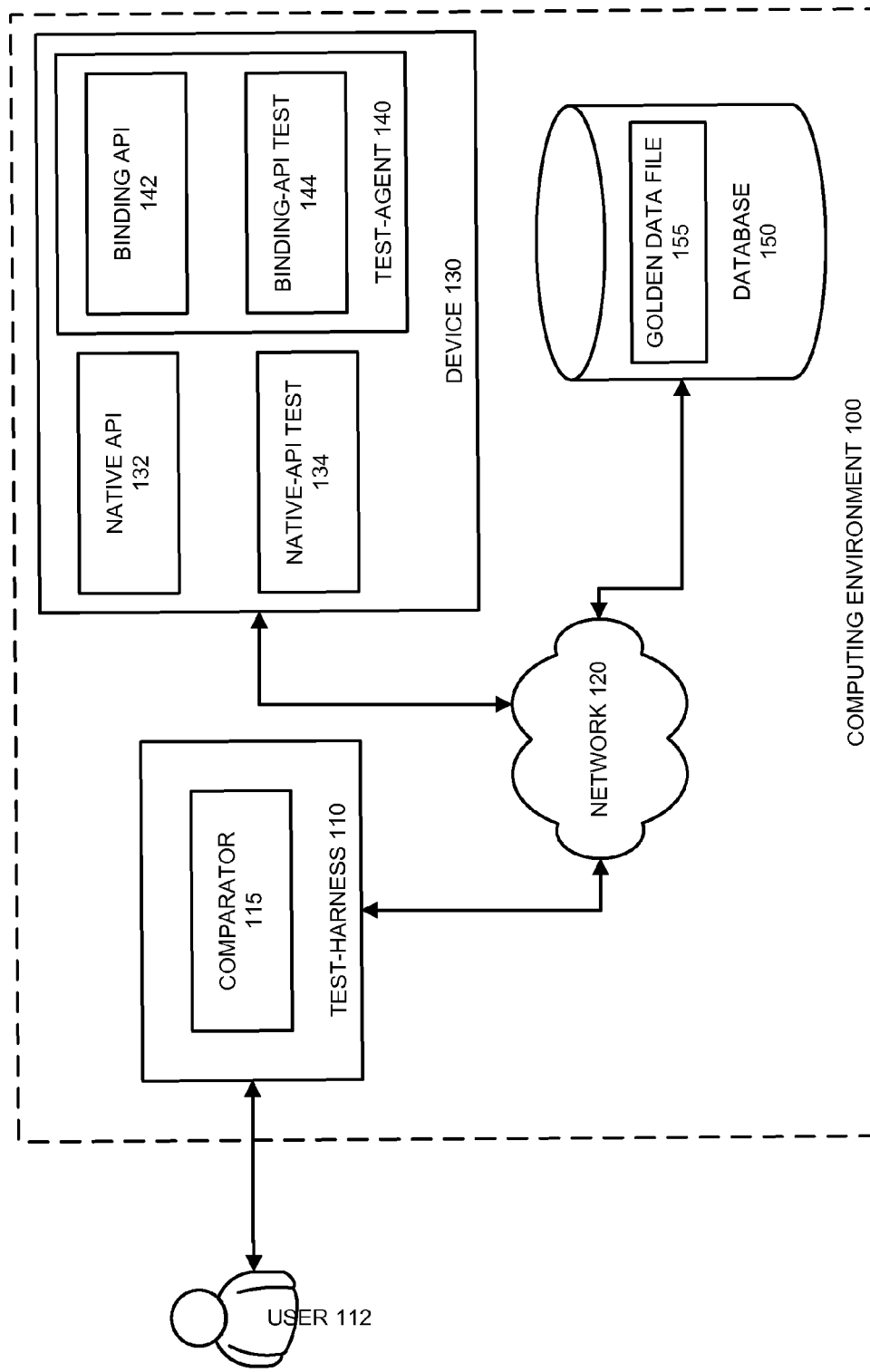
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on: a microprocessor, a mainframe computer, a digital signal processor, a portable computing device, a personal organizer, a device controller, or a computational engine within an appliance. More specifically, computing environment 100 includes: test-harness 110, network 120, device 130, and database 150.

Test-harness 110 can generally include any node on a network including computational capability and including a mechanism for communicating across the network. Furthermore, test-harness 110 can include any system, which facilitates execution of a test on a device, such as device 130.

In one embodiment of the present invention, test-harness 110 can be a distributed computing system.

In one embodiment of the present invention, test-harness 110 includes comparator 115. Comparator 115 can generally include any system for comparing test-results to determine if the test-results are equivalent.

Network 120 can generally include any type of wired or wireless communication channel capable of coupling together computing nodes. This includes, but is not limited to, a local area network, a wide area network, or a combination of networks. In one embodiment of the present invention, network 120 comprises the Internet.

Device 130 can generally include any node on a network including computational capability and including a mechanism for communicating across the network. Furthermore, device 130 can include native API 132 and test-agent 140.

In one embodiment of the present invention, device 130 can be a resource-constrained device.

Native API 132 can generally include any API that provides direct access to the hardware. This can include a hardware API, a software API, or a combination of a hardware API and a software API.

Test-agent 140 can generally include any system that facilitates executing a binding-API test, such as binding-API test 144.

In one embodiment of the present invention, test-agent 140 can be a hardware system, a software system, or a combination of a hardware system and a software system.

Binding API 142 can generally include any API that is bound to native API 132, or a subset of native API 132.

In one embodiment of the present invention, user 112 can request that device 130 execute a given command associated with native API 132 by requesting that device 130 execute a corresponding command associated with binding API 142 that is bound to the given command.

In one embodiment of the present invention, test-agent 140 can execute any application or part of an application that uses binding API 142.

In one embodiment of the present invention, test-agent 140 can be a stand-alone system.

In one embodiment of the present invention, device 130 is capable of executing any application that uses native API 132, such as native-API test 134.

In one embodiment of the present invention, device 130 is capable of executing any application that uses binding API 142. Note that device 130 may or may not execute the applications via test-agent 140.

Database 150 can generally include any type of system for storing data in non-volatile storage. This includes, but is not limited to, systems based upon magnetic, optical, and magneto-optical storage devices, as well as storage devices based on flash memory and/or battery-backed up memory. Note that database 150 can store golden data file 155.

Golden data file 155 can generally include any data structure for storing a test-result associated with native-API test 134.

In one embodiment of the present invention, golden data file 155 can generally store any test-result from a known correctly implemented API. (In this embodiment, native API 132 is a known correctly implemented API.)

User 112 can generally include: an individual; a group of individuals; an organization; a group of organizations; a computing system; a group of computing systems; or any other entity that can interact with computing environment 100.

In one embodiment of the present invention, user 112 can be a client.

Testing a Binding API

Figure 2:
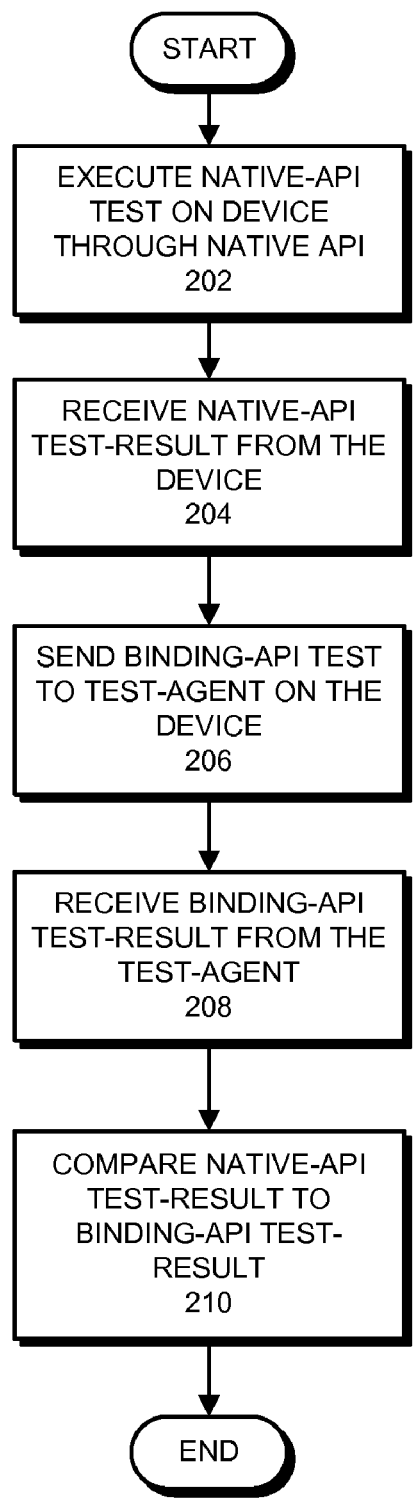
FIG. 2 presents a flowchart illustrating testing a binding Application Programming Interface (API) in accordance with an embodiment of the present invention.

FIG. 2 presents a flowchart illustrating a process for testing a binding Application Programming Interface (API) in accordance with an embodiment of the present invention. The process begins when test-harness 110 executes native-API test 134 on device 130 through native API 132 (operation 202). Test-harness 110 then receives a native-API test-result from device 130 (operation 204). Note that test-harness 110 facilitates testing binding API 142 by sending tests to device 130 and receiving test-results from device 130.

In one embodiment of the present invention, device 130 stores the native-API test-result in golden data file 155 on database 150. In this embodiment, test-harness 110 retrieves the native-API test-result from database 150.

In one embodiment of the present invention, the native-API test-result can include: images, text, video, audio, and any other type of data that native-API test 134 can produce.

Next, test-harness 110 sends binding-API test 144 to test-agent 140 on device 130 (operation 206). This enables test-agent 140 to execute binding-API test 144 through binding API 142 to produce a binding-API test-result. Test-harness 110 then receives the binding-API test-result from test-agent 140 (operation 208).

In one embodiment of the present invention, the binding-API test-result can include: images, text, video, audio, and any other type of data that binding-API test 144 can produce.

In one embodiment of the present invention, native-API test 134 and binding-API test 144 include equivalent command flows.

In one embodiment of the present invention, test-agent 140 facilitates executing binding-API test 144. This may involve processing binding API commands, which are associated with binding API. 142.

In one embodiment of the present invention, test-agent 140 may facilitate executing binding-API test 144 by: mapping binding API function calls to native API function calls; optimizing native API function calls based on the command flow of binding-API test 144; or any other process that facilitates executing binding-API test 144. In this embodiment, because test-agent 140 may optimize native API function calls, comparing function calls made by native-API test 134 and binding-API test 144 may not sufficiently determine if binding API 142 is functionally equivalent to native API 132.

In one embodiment of the present invention, the implementation of binding API 142 includes: the mapping of binding API function calls to native API function calls; and the optimization of native API function calls based on the command flow of binding-API test 144. In this embodiment, because binding API 142 includes optimization of native API function calls, comparing function calls made by native-API test 134 and binding-API test 144 may not sufficiently determine if binding API 142 is functionally equivalent to native API 132.

In one embodiment of the present invention, the optimization of native API function calls is static. In this embodiment, the optimization of native API function calls may not be based on the command flow of binding-API test 144.

In one embodiment of the present invention, before executing a binding API function call that is bound to a native API function call, test-agent 140 may execute multiple binding API function calls which are not bound to a native API function call. This enables binding API 142 to provide user 112 with a greater selection of function calls than native API 132 may provide.

Test-harness 110 then uses comparator 115 to compare the native-API test-result to the binding-API test-result (operation 210) to determine if binding API 142 is functionally equivalent to native API 132. Note that for binding API 142 to be functionally equivalent to native API 132, binding API 142 should produce the same results for a given command-flow as native API 132 produces for the given command-flow.

In one embodiment of the present invention, comparator 115 may use a threshold to determine if the native-API test-result is equal to the binding-API test-result. For example, suppose that the native-API test-result and the binding-API test-result are images, and that the binding-API test-result is of a lower resolution than the native-API test-result. If the difference in resolution between the images is below the threshold, comparator 115 may still determine that the native-API test-result and the binding-API test-result are functionally equivalent.

In one embodiment of the present invention, user 112 specifies the threshold.

In one embodiment of the present invention, comparing the native-API test-result to the binding-API test-result may involve comparing function calls made while executing native-API test 134 and binding-API test 144.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing a binding Application Programming Interface (API) on a device, wherein the binding API is bound to a native API for a device and provides different commands than the native API, the method comprising:
   executing a native-API test on the device through the native API to produce a native-API test-result;
   receiving the native-API test-result from the device;
   sending a binding-API test to a test-agent on the device which enables the test-agent to execute the binding-API test through the binding API to produce a binding-API test-result;
   receiving the binding-API test-result from the test-agent; and
   comparing the native-API test-result to the binding-API test-result to determine if the binding API is functionally equivalent to the native API.

2. The method of claim 1, wherein the device can be a resource-constrained device.

3. The method of claim 1, wherein the native-API test-result and the binding-API test-result can include:
   images;
   text;
   video; and
   audio.

4. The method of claim 1, wherein comparing the native-API test-result to the binding-API test-result involves comparing function calls made while executing the native-API test to function calls made while executing the binding-API test.

5. The method of claim 1, wherein the native-API test and the API test include equivalent command flows.

6. The method of claim 1, wherein the native API can be:
   a hardware API;
   a software API; and
   a combination of the hardware API and the software API.

7. The method of claim 1, wherein the test-agent facilitates executing the binding-API test by processing binding API commands, which are associated with the binding API.

8. A computer-readable storage medium storing instructions that when executed by a computer cause the computer to perform a method for testing a binding Application Programming Interface (API) on a device, wherein the binding API is bound to a native API for a device and provides different commands than the native API, the method comprising:
   executing a native-API test on the device through the native API to produce a native-API test-result;
   receiving the native-API test-result from the device;
   sending a binding-API test to a test-agent on the device which enables the test-agent to execute the binding-API test through the binding API to produce a binding-API test-result;
   receiving the binding-API test-result from the test-agent; and
   comparing the native-API test-result to the binding-API test-result to determine if the binding API is functionally equivalent to the native API.

9. The computer-readable storage medium of claim 8, wherein the device can be a resource-constrained device.

10. The computer-readable storage medium of claim 8, wherein the native-API test-result and the binding-API test-result can include:
   images;
   text;
   video; and
   audio.

11. The computer-readable storage medium of claim 8, wherein comparing the native-API test-result to the binding-API test-result involves comparing function calls made while executing the native-API test to function calls made while executing the binding-API test.

12. The computer-readable storage medium of claim 8, wherein the native-API test and the API test include equivalent command flows.

13. The computer-readable storage medium of claim 8, wherein the native API can be:
   a hardware API;
   a software API; and
   a combination of the hardware API and the software API.

14. The computer-readable storage medium of claim 8, wherein the test-agent facilitates executing the binding-API test by processing binding API commands, which are associated with the binding API.

15. An apparatus that tests a binding Application Programming Interface (API) on a device, wherein the binding API is bound to a native API for a device and provides different commands than the native API, the apparatus comprising:
   an execution mechanism configured to execute a native-API test on the device through the native API to produce a native-API test-result;
   a receiving mechanism configured to receive the native-API test-result from the device;
   a sending mechanism configured to send a binding-API test to a test-agent on the device which enables the test-agent to execute the binding-API test through the binding API to produce a binding-API test-result;

wherein the receiving mechanism is further configured to receive the binding-API test-result from the test-agent; and a comparison mechanism configured to compare the native-API test-result to the binding-API test-result to determine if the binding API is functionally equivalent to the native API.

16. The apparatus of claim 15, wherein the device can be a resource-constrained device.

17. The apparatus of claim 15, wherein the comparison mechanism is further configured to compare function calls made while executing the native-API test to function calls made while executing the binding-API test.

18. The apparatus of claim 15, wherein the native API can be:

a hardware API;

a software API; and a combination of the hardware API and the software API.

19. The apparatus of claim 15, wherein the test-agent is configured to facilitate executing the binding-API test, and wherein the test-agent comprises a processing mechanism configured to process binding API commands, which are associated with the binding API.

* * * * *